United States Patent

Adams

[15] 3,700,203
[45] Oct. 24, 1972

[54] VEHICLE SEAT SUPPORT
[72] Inventor: Albert John Adams, 3, Richmond Way, Fetcham, England
[22] Filed: Feb. 5, 1971
[21] Appl. No.: 113,005

[52] U.S. Cl. ............................ 248/419, 297/346
[51] Int. Cl. .................................... B60n 1/02
[58] Field of Search ...... 248/419, 378, 420; 108/145; 297/346

[56] References Cited

UNITED STATES PATENTS

| | | |
|---|---|---|
| 2,091,088 | 8/1937 | Whedon et al. ........ 248/419 X |
| 2,124,754 | 7/1938 | Simpson et al. ........... 108/145 |
| 2,175,452 | 10/1939 | Whedon ................ 248/419 X |
| 2,149,945 | 3/1939 | Whedon ..................... 248/419 |
| 3,316,014 | 4/1967 | Barecki .................. 297/346 X |
| 3,473,776 | 10/1969 | Costin ....................... 248/419 |

Primary Examiner—Chancellor E. Harris
Attorney—Berman, Davidson & Berman

[57] ABSTRACT

A vehicle seat support in which a single tension spring performs the functions previously performed, in one known construction of vehicle seat support, by a tension spring and two coiled springs, namely, control of the elevation of a seat frame assembly relative to a floor frame assembly and operation of a catch mechanism to maintain a chosen elevation setting of the seat frame assembly.

6 Claims, 6 Drawing Figures

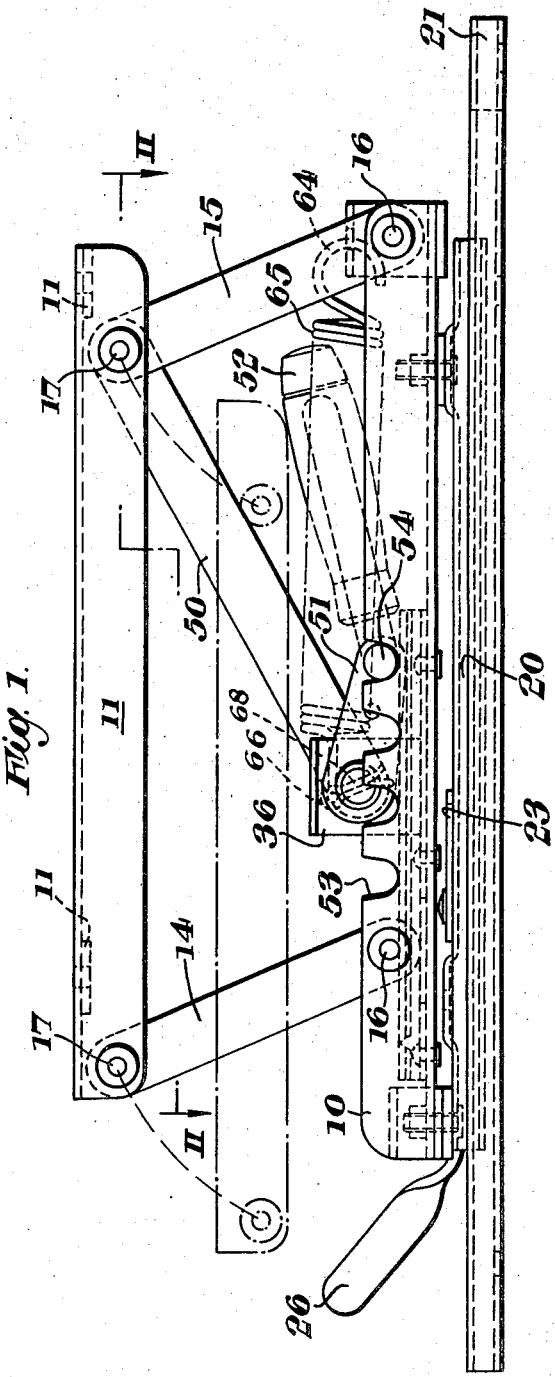
INVENTOR
ALBERT JOHN ADAMS,
BY
Berman, Davidson & Berman,
ATTORNEYS

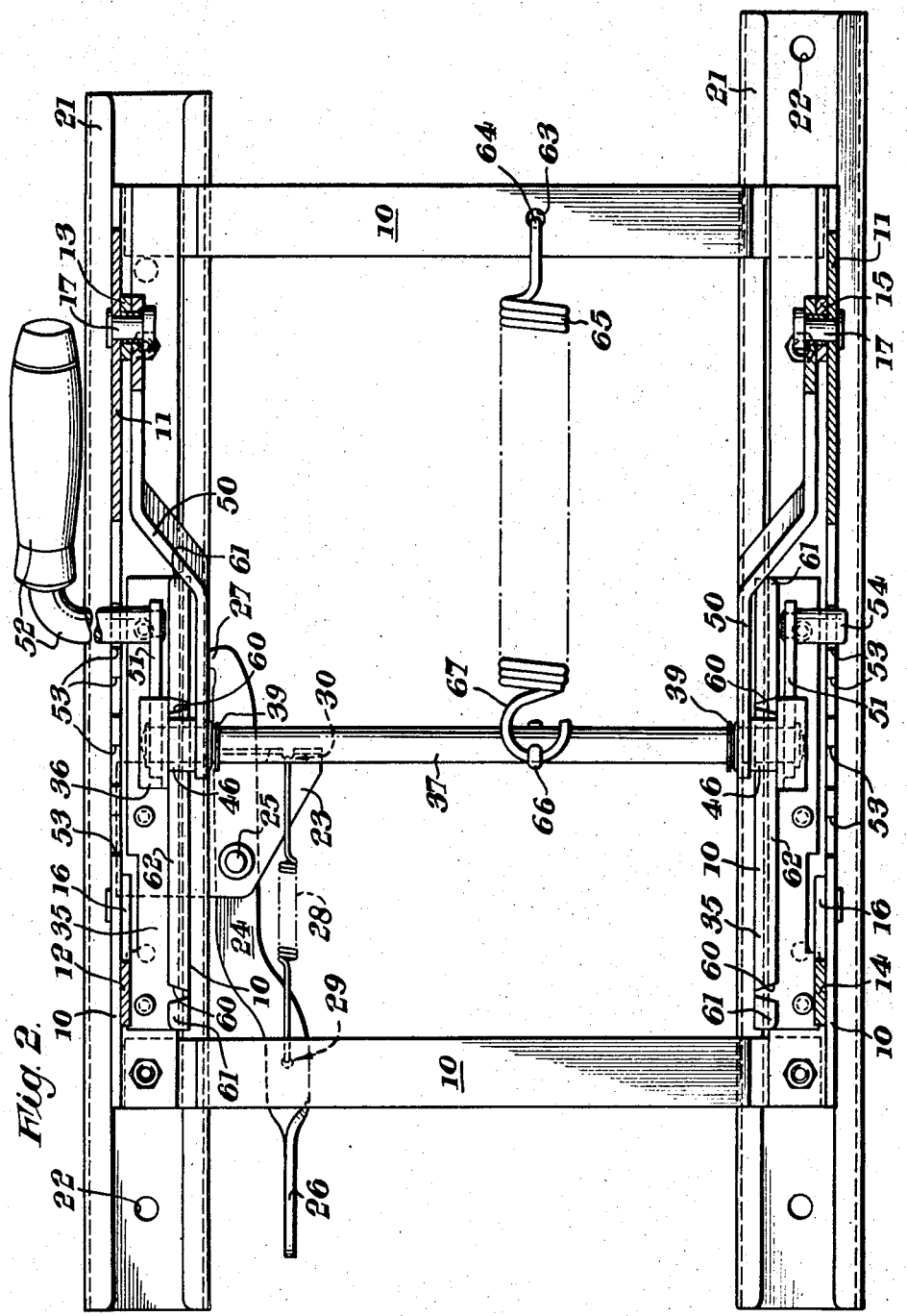

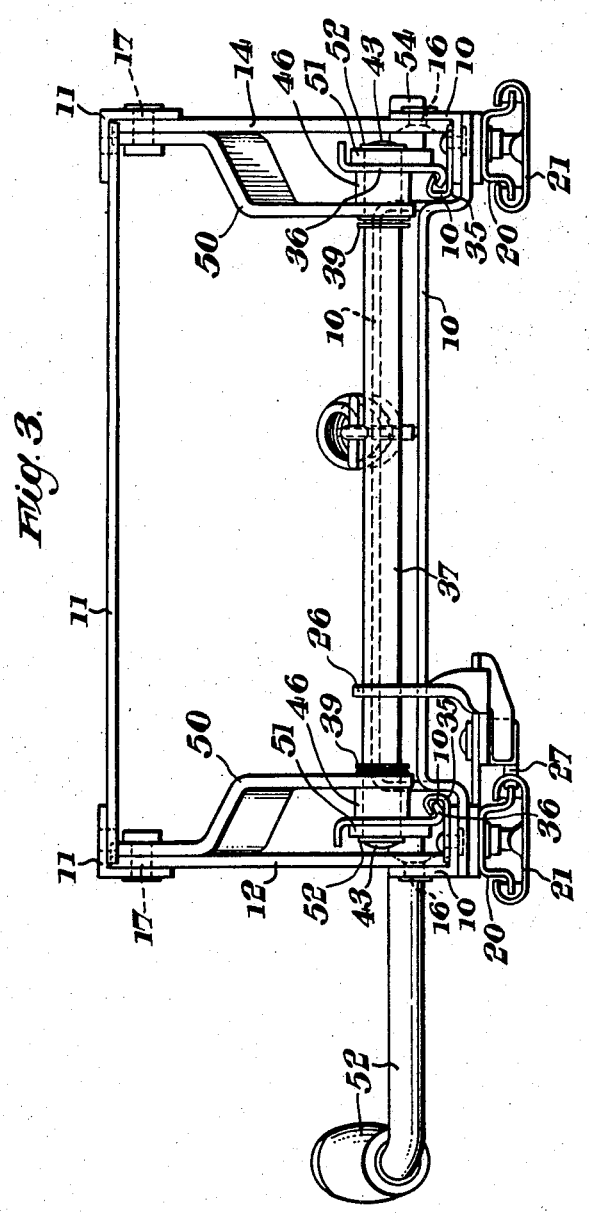

PATENTED OCT 24 1972
3,700,203
SHEET 4 OF 4
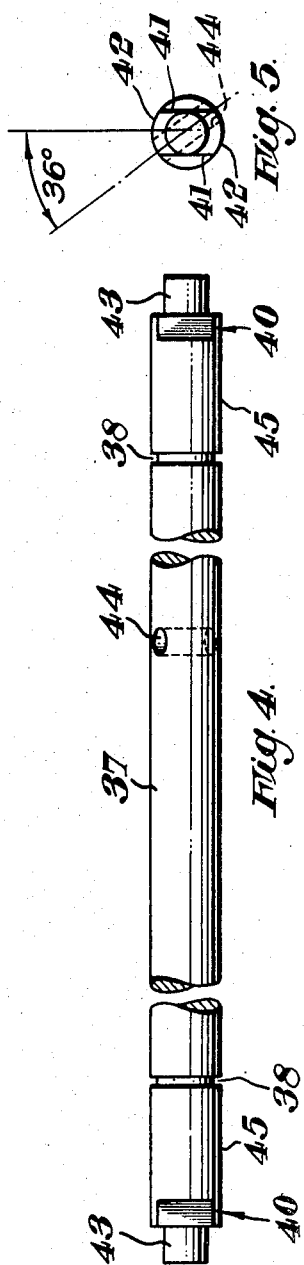
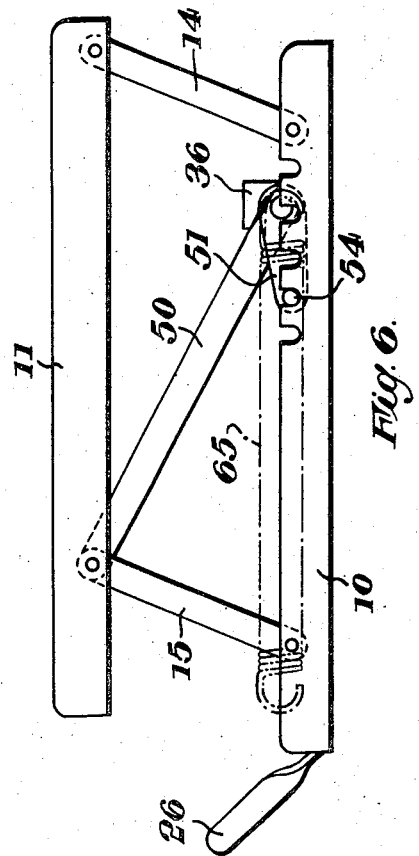
INVENTOR:
ALBERT JOHN ADAMS,
BY
Berman, Davidson & Berman,
ATTORNEYS.

VEHICLE SEAT SUPPORT

This invention relates to a vehicle seat support which is, inter alia, adjustable for height.

A vehicle seat support (hereinafter referred to as a "vehicle seat support of the type described") comprises the following:

1. a floor frame assembly which is intended to be secured either direct to the vehicle floor or to the movable slide members of a seat slide mechanism whose fixed slide members are fixed to the vehicle floor;

2. a seat frame assembly which is intended to be secured to the frame or other part of the vehicle seat;

3. parallel links at each side of said assemblies, one end of each of said links being pivotally connected to the respective side element of the floor frame assembly and the other end of each of said links being pivotally connected to the respective side element of the seat frame assembly, the arrangement being such that said seat frame and said floor frame assemblies are displaceable with respect to one another whilst being maintained in their desired relative attitudes (namely, either parallel to one another or at a predetermined angle with respect to one another);

4. each of the side elements of the floor frame assembly, which side elements are parallel to one another, is provided with notches which are spaced from one another lengthwise of said side element and is also provided with a female slide member in which there is arranged to slide a male slide member which forms a part of a catch lever assembly;

5. the said two male slide members are connected to one another by a transverse shaft. At or in the vicinity of each of its ends, said shaft is pivotally connected to the respective ends of two cross-levers or bracing levers whose other respective ends are pivotally connected to said respective side elements of the seat frame assembly at the points thereon to which are connected the other ends of those two links of the two pairs of parallel links which are in alignment with one another across the seat support either towards the front of the seat or towards the rear of the seat, the arrangement being such that when the male slide members are moved relative to the female slide members together with the said shaft the seat frame assembly is displaced relative to the floor frame assembly in accordance with the direction of motion of said male slide members (for example motion of said male slide members towards the front of the seat causing the seat frame assembly to be moved downwardly towards the floor frame assembly if the forward and lower ends of the cross-levers are connected to said male slide members and if the rear and upper ends of the cross-levers are connected to the same points on the side elements of the seat frame assembly as are the upper ends of the rear transversely aligned links);

6. operating levers are fixedly connected to the ends of said shaft, each operating lever having means thereon intended to engage one of the notches at a time which are provided in the adjacent side element of the floor frame assembly. In the case of the operating lever at one end of said shaft, said means is generally constituted by a boss whose axial length is merely sufficient to ensure positive engagement thereof with a notch whereas, in the case of the operating lever at the other end of said shaft, said boss is replaced by or is elongated to form a handle to enable the user of the seat to obtain the desired height-adjustment by rotation of the shaft which is at all times urged under the influence of a spring or springs to move towards either the front or the back of the seat (for example towards the back of the seat when motion of said male slide members towards the front of the seat causes the seat frame assembly to be moved downwardly, as aforesaid).

One known construction of vehicle seat support of the type described is made in the following manner insofar as the particular parts mentioned are concerned.

a. the shaft to the ends of which the operating levers are connected comprises a tube into the open ends of which are inserted two spigots which are keyed to the tube, the projecting ends of the spigots being welded to said operating levers. Consequently, when the handle is operated, the two operating levers and the spigots and the tube move as a single unit.

b. the relevant end of each of the two cross-levers is pivotally connected to said shaft between the respective end of said tube and the adjacent operating lever, the projecting end of the spigot concerned extending through an aperture formed in said relative end and also through an aperture formed in the adjacent male slide members.

c. each of said spigots also extends through a coiled spring of which one end is anchored to the adjacent cross-lever and of which the other end is anchored to the adjacent operating lever, the springs providing the spring bias which tends to maintain the boss and the handle portion carried by the respective operating levers in positive engagement with the selected notches in the side elements of the floor frame assembly.

d. one or each of two tension springs has the terminal or connecting loop at one end thereof connected to said shaft and the terminal or connecting loop at the other end thereof connected to a transverse strut of the floor frame assembly, the tension spring or springs functioning solely to tend at all times to elevate the seat frame assembly to the greatest permitted extent.

With said one construction, the number of operations to be carried out at the various stages of fabrication and assembly (for example welding the spigots to the operating levers, pinning the spigots to the tube at two spaced locations in respect of each spigot, assembly of the coiled springs on said spigots between the ends of the cross-levers and the male slide members) and the number of parts which have to be made increase the cost of the product and the principal object of the present invention is to provide a novel construction of vehicle seat support of the type described which is cheaper to manufacture by virtue of having less parts to be fabricated and/or assembled and by virtue of the use of at least one less fabricating step which is less costly than the fabricating step which it replaces, the novel construction operating at least as efficiently as said known construction.

Accordingly, the present invention consists in a vehicle seat support of the type described (as hereinbefore defined) wherein the transverse shaft is a rod which is of circular section at least over end regions thereof which are spaced from the mid-length point of said shaft, portions of said shaft which are located axially outwardly of said end regions with respect to said mid-length point being of cross-sectional shapes which are other than circular, a female slide member fixed to each of the two parallel side elements of the floor frame assembly and a male slide member slidably engaging each female slide member, said end regions of said shaft extending not only through circular apertures in the vicinities of the respective ends of the cross-levers but also through circular apertures in said male slide members, a stop means located on said shaft on that side of each of said cross-levers which is nearer to said mid-length point whereby movement of said cross-levers axially of the shaft towards said point is prevented, said two operating levers having apertures therein which are complementary to the non-circular cross-sectional shapes of said shaft portions which are located axially outwardly of said end regions, said shaft portions extending through said apertures in the operating levers, terminal portions of said shaft projecting beyond those faces of the operating levers which are directed away from said mid-length point, said terminal portions being spun or peened over on to said faces, each operating lever also carrying at least a boss extending in a direction transversely of the floor frame assembly and intended to engage one at a time of a number of spaced notches formed in the respective one of said two parallel side elements, a stop provided at each end of each female slide member to limit the extent of the relative movements of the male and female slide members, and a tension spring of which one end is anchored to the vehicle and of which the other end is so anchored to said shaft as to tend at all times not only to cause said shaft to rotate about its longitudinal axis to ensure that said bosses are accommodated in two of said notches which are in alignment with one another transversely of the floor frame assembly but also to cause said seat frame assembly to assume its most elevated condition with respect to said floor frame assembly, whereby the adjustment of the height of the seat frame assembly in relation to the floor frame assembly is effected under or against the influence of the power stored in said tension spring simply by a user of the seat rotating said shaft and the operating levers connected thereto against the influence of the power stored in said spring and thereby removing said bosses from the respective aligned notches in which they were accommodated and whereby the maintenance of the selected height is effected simply by said user permitting said shaft and the operating levers to be rotated under the influence of the power stored in said spring and said bosses to become accommodated in other aligned notches.

In a preferred embodiment, the said one end of the tension spring is anchored to a transverse strut which forms a part of the floor frame assembly. There may, of course, be two tension springs instead of a single tension spring.

In said preferred embodiment, said stops which are provided at the opposite ends of the female slide members are preferably constituted by deformed end parts of those limbs of the female slide members with which corresponding limbs of the male slide members engage with freedom for sliding movement.

Further, in said preferred embodiment, there may be an annular spacing element fixed to the respective end of each of the cross-levers, said spacing element extending from the cross-lever away from said mid-length point of the shaft and the free end of said spacing element abutting that face of the respective male slide member which is directed towards said mid-length point.

Further, in said preferred embodiment, said shaft may be provided with spaced continuous circumferential grooves normal to the longitudinal axis of the shaft, a circlip or similar snap-fastening device being detachably fastened to said shaft at each of said grooves and being located in each of said grooves, said circlips or devices constituting the stop means whereby said movement of the cross-levers axially of the shaft is prevented.

Again, in said preferred embodiment, said shaft portions which have cross-sectional shapes other than circular are preferably portions of said shaft each of which is in cross-section a four-sided figure having two opposite sides parallel to one another and to a diameter of the circular rod which constitutes the shaft and whose other two sides are curved outwardly and symmetrically with respect to the longitudinal axis of the shaft, the radii of curvature of the curves being equal to one another and equal to the radius of the circular section rod.

Lastly in said preferred embodiment the rod which constitutes the shaft has drilled therethrough a diametral passageway which extends completely through the shaft, the passageway being intended for the accommodation of a split-pin, the angle at which said passageway is drilled being (when the shaft is assembled in the seat support) canted out of the vertical and away from the rear of the seat if the tension spring has one end thereof anchored at the rear of the seat or away from the front of the seat if said tension spring has one end thereof anchored at the front of the seat. We have found that the optimum angle at which said passageway should be drilled in 36° with respect to the vertical. If this angle is decreased by too great an extent the force applied by the spring which tends to cause the shaft to rotate as aforesaid will not be sufficient, whereas if said angle is increased there will be a tendency for the hooked end of the spring to foul on the outer surface of the shaft.

The present invention will now be more particularly described with reference to the accompanying drawings, in which:

FIG. 1 illustrates in side elevation a vehicle seat support of the type described (as hereinbefore defined) constructed, arranged and operable in accordance with the present invention;

FIG. 2 illustrates a view of side vehicle seat support taken on the line II — II in FIG. 1;

FIG. 3 illustrates a front elevation of the vehicle seat support illustrated in FIG. 1;

FIG. 4 illustrates in front elevation a shaft which forms a part of the vehicle seat support illustrated in FIGS. 1, 2 and 3;

FIG. 5 is an end view of said shaft; and

FIG. 6 illustrates diagrammatically and in a simplified manner an alternative arrangement of some of the parts illustrated in FIGS. 1 to 3.

Referring to FIGS. 1, 2 and 3; there is illustrated a vehicle seat support of the type described (as hereinbefore defined) which consists of a floor frame assembly 10 and a seat frame assembly 11 which are connected to one another by parallel links 12, 13, 14, 15. As will be seen in said Figures, the lower end of each of the links 12 to 15 is pivotally connected at 16 to the respective one of the side elements of the floor frame assembly 10, said side elements being maintained in parallel relationship by means of transverse struts which are also parallel to one another. Likewise, it will be seen in said Figures that the upper end of each of the links 12 to 15 is pivotally connected at 17 to the respective one of the side elements of the seat frame assembly 11, said side elements being maintained in parallel relationship by means of transverse struts which are also parallel to one another.

The parallel side elements of the floor frame assembly 10 are fastened to movable slide members 20 of a seat slide mechanism whose fixed slide members 21 are intended for attachment to the vehicle floor, for example by means of bolts (not illustrated) extending through holes 22 in the members 21 and through holes in the vehicle floor (also not illustrated). A plate 23 is securely attached to one of the movable slide members 20 (namely, to the left-hand slide member 20 as seen in FIG. 3), said plate 23 having a catch 24 mounted thereon for pivotal movements about the axis of a pivot rod 25. The catch 24 is shaped at one end thereof to form a finger piece 26 and is shaped at the other end thereof to form a dog or tooth 27, said catch being biased (by means of a spring 28 anchored at one end 29 thereof to the catch 24 and at the other end 30 thereof to the plate 23) in such a manner that the dog 27 is caused to extend through one of a number of apertures in the left-hand fixed slide member 21 as seen in FIG. 3 and to engage one of a number of notches formed in the edge of the associated movable slide member 20. The apertures in said member 21 and the notches formed in said member 20 are not illustrated in the drawings because the arrangement concerned or mechanical equivalents thereof are well-known in the art (for example in United Kingdom Patent Specification No. 648,183), being provided for the releasable securing of the member 20 to the member 21 in order to maintain a selected setting of the members 20 relative to the members 21.

It will be seen from FIGS. 2 and 3 that each of the side elements of the floor frame assembly is provided with or includes a female slide member 35 in which there is arranged to slide a male slide member 36 which forms a part of a catch lever assembly which will now be described in detail. A shaft 37 extends transversely of the vehicle seat support, said shaft being illustrated in FIGS. 4 and 5 and consisting of a circular-section rod which is provided with:

i. two spaced continuous circumferential grooves 38 which are normal to the longitudinal axis of the shaft 37 for the accommodation of two E-clips or similar snap-fastening devices 39 (see FIG. 2);

ii. shaft portions 40 which, in cross-section, are four-sided figures each of which is constituted by two opposite flat sides 41 which are parallel to one another and parallel to a diameter of the circular-section rod and by two other sides 42 which are curved outwardly and symmetrically with respect to the longitudinal axis of the shaft, the radii of curvature of the curves being equal to one another and equal to the radius of the circular-section rod;

iii. end regions 43 which are of circular section but of reduced diameter compared with that of the greater part of the length of the shaft 37, said end regions 43 being, however, coaxial with the shaft 37 and not eccentric; and iiii. a drilled hole or passageway 44 extending diametrally of the shaft 37 at an angle of 36° to the plane containing the diameter which is referred to in paragraph (ii) above.

Said shaft 37 has two portions 45 which are defined or bounded by the grooves 38 on the one hand and the shaft portions 40 on the other hand and these two portions 45 extend into and are partially accommodated within annular spacing elements 46 which extend through and are secured to corresponding one ends of two cross-levers 50 whose corresponding other ends are pivotally connected at 17 to the respective side elements of the seat frame assembly 11. The devices 39 prevent the cross-levers 50 and the attached elements 46 from moving axially of the shaft 37 towards the mid-length point of the shaft beyond said devices. That part of each of the portions 45 which is not accommodated within the respective one of the spacing elements 46 extends into a hole or passageway which is formed in the respective one of the male slide members 36, whereby said male slide members 36 are mounted on the shaft 37.

The shaft portions 40 extend into apertures in operating levers 51, said apertures having shapes which are complementary to those of the shaft portions 40, whereby movement of that end of one of the operating levers 51 which is remote from said aperture therein angularly about the longitudinal axis of the shaft 37 will cause identical angular movement of said shaft about said axis.

Lastly, two washers 52 are placed on the end regions 43 and the said end regions are spun over or peened over on to the washers to retain the assembly in its desired condition.

The upper operating lever 51 as seen in FIG. 2 had fixed thereto one end of a cranked handle 52 of which a part is illustrated resting in one of a series of notches 53. The lower operating lever 51 as seen in FIG. 2 has fixed thereto a boss 54 of which a part is illustrated resting in one of another series of notches 53 (see also FIG. 1) identical with the first-mentioned series of notches 53. The two series of notches 53 are in alignment with one another transversely of the vehicle seat support and are formed in the upper edges of the respective side elements of the floor frame assembly 10.

It will be noticed from FIG. 2 that the female slide members 36 have spaced V-shaped notches 60 formed therein, said notches 60 creating two spaced tongues 61 and an intermediate tongue 62. When the catch lever assembly (which consists of the shaft 37, the devices 39, the cross-levers 50 and their attached spacing elements 46, the male slide members 36, the operating levers 51, the washers 52, the spun over or peened over end regions 43, the handle 52 and the boss 54) has been placed in position with the male slide members 36 engaging the intermediate tongue 62 of the female slide members 35, said spaced tongues 61 are formed or deformed down so as to limit the freedom for sliding movements made by the male slide members 36 relative to the female slide members 35 towards either the front or the back of the vehicle seat support.

The right-hand transverse strut of the floor frame assembly 10 is provided with a hole 63 through which there is arranged to extend a hooked end 64 of a tension spring 65. A split pin 66 is caused to extend through the passageway 44 drilled through the shaft 37 and is deformed in the usual manner to connect the pin 66 securely to the shaft, the other hooked end 67 of said spring 65 arranged to extend through the loop or eye 68 of the split pin 66. It will be seen from FIG. 1 that the passageway 44 and, therefore, the split pin 66 extending therethrough are so disposed that the loop or eye 68 is canted away from the transverse strut to which the hooked end 64 of the spring is attached, this arrangement ensuring that the spring 65 acts upon the shaft 37 to tend to cause the respective parts of the handle 52 and the boss 54 to engage one of the respective notches 53. Furthermore, by reason of the fact that the lower ends (as seen in FIGS. 1 and 3) of the cross-levers 50 are pivotally connected to the shaft 37, said spring 65 will always tend to cause the seat frame assembly 11 to assume its greatest elevation above the floor frame assembly 10 when the seat frame assembly is not supporting a load (for example the driver of the vehicle) and when said respective parts of the handle 52 and the boss 54 are lifted out of engagement with the respective notches 53. Movement upwardly of said seat frame assembly 11 under said spring influence, or movement downwardly of said seat frame assembly 11 against the influence of the spring 65 and under the influence of, say, the weight of the driver, is always such that the attitude of the seat frame assembly 11 relative to the floor frame assembly 10 remains unaltered by virtue of the parallel link motion provided by the links 12, 13, 14, 15.

Referring briefly to FIG. 6, there is illustrated therein an alternative arrangement in which the relative positions of some of the constituent parts of the vehicle seat support which has been described above with reference to FIGS. 1 to 5 have been reversed without any loss of the operating efficiency of the vehicle seat support illustrated in said FIGS. 1 to 5. Further description of FIG. 6 is deemed to be unnecessary.

The most important advantages obtained by employment of the present invention are as follows:

Firstly, the use of a circular section rod to act as the shaft 37 eliminates the steps of connecting (in the manner previously described) the respective one ends of two spigots to the ends of the tube which, in said one known construction, acted as the shaft 37. Also, the welding of the respective other ends of said two spigots to the operating levers is eliminated, positive connection of the operating levers 51 to the shaft 37 being effected in a simple manner by the shaft portions 40 and the complementary apertures in the operating levers 51.

Secondly, the coiled springs which were provided in said one known construction of vehicle seat support in order to bias the boss and the handle portion at all times into positive engagement with the selected notches in the side elements of the floor frame assembly are unnecessary. Said bias is, in the construction according to the present invention, provided by the spring 65 which performs two functions, namely, providing said bias and tending at all times to elevate the seat frame assembly to the greatest permitted extent.

The elimination of these operational steps (namely, pinning each of the two spigots to the respective tube end at two spaced locations and welding the spigots to the operating levers) and the elimination of the assembly step (namely, assembly of the two coiled springs on said spigots between the cross-levers and the male slide members whilst at the same time ensuring that one end of each spring engaged the respective cross-lever and that the other end of each spring correctly engaged the respective operating lever to provide said bias) and the omission of the two coiled springs have all contributed to a significant saving of labor and purchasing costs. Not only is it unnecessary to purchase or to manufacture the two coiled springs but also the spinning over or peening over of the end regions 43 on to the washers 52 in the construction according to the present invention and the creation of the shaped shaft portions 40 and of the end regions 43 are less expensive operations than the double-pinning of the spigots to the tube ends and the welding of the spigots to the operating levers in the manufacture of the said one known construction.

It will be appreciated that the grooves 38 and the E-clips or devices 39 had to be provided because of the abandonment of a tube for the shaft and of the two spigots inserted into the tube ends and pinned thereto, the shoulders formed by the difference between the outside diameter of the tube and the outside diameter of each of the spigots acting, in said one known construction, to prevent axial movements of the cross-levers towards one another along the shaft.

I claim:

1. A vehicle seat support comprising a floor frame assembly and a seat frame assembly each including two parallel side elements, parallel links at each side of said assemblies pivoted at their ends respectively to the side elements of the floor frame and seat frame assemblies, a series of longitudinally spaced notches in each of said side elements of the floor frame assembly, a female slide member fixed to each of said side elements of the floor frame assembly and a male slide member, having a circular aperture therein, slidably engaging each female slide member, a catch lever assembly including two cross-levers whose upper ends are pivotally connected to the side elements of the seat frame assembly and whose lower ends are provided with circular apertures receiving a transverse shaft, and two operating levers on said shaft each having a boss engageable in one of said notches in the adjacent side element of the floor frame assembly, said transverse shaft being a rod which is of circular section at least over end regions thereof which are spaced from the mid-length point of said shaft, portions of said shaft which are located axially outwardly of said end regions with respect to said mid-length point being of cross-sectional shapes which are other than circular, said end regions of said shaft extending not only through the circular apertures in the cross-levers but also through said circular apertures in the male slide members, a stop means located on said shaft on that side of each of said cross-levers which is nearer to said mid-length point whereby movement of said cross-levers axially of the shaft toward said point is prevented, said two operating levers having apertures therein which are complementary to the non-circular cross-sectional shapes of said shaft portions which are located axially outwardly of said end regions, said shaft portions extending through said apertures in the operating levers, terminal portions of said shaft projecting beyond those faces of the operating levers which are directed away from said mid-length point, said terminal portions being spun or peened over onto said faces, a stop provided at each end of each female slide member to limit the extent of the relative movements of the male and female slide members, and a tension spring of which one end is adapted to be anchored to the vehicle and of which the other end is so anchored to said shaft as to tend at all times not only to cause said shaft to rotate about its longitudinal axis to ensure that said bosses are accommodated in two of said notches which are in alignment with one another transversely of the floor frame assembly but also to cause said seat frame assembly to assume its most elevated condition with respect to said floor frame assembly whereby the adjustment of the height of the seat frame assembly in relation to the floor frame assembly is effected under or against the influence of the power stored in said tension spring simply by a user of the seat rotating said shaft and the operating levers connected thereto against the influence of the power stored in said spring and thereby removing said bosses from the respective aligned notches in which they were accommodated and whereby the maintenance of the selected height is effected simply by said user permitting said shaft and the operating levers to be rotated under the influence of the power stored in said spring and said bosses to become accommodated in other aligned notches.

2. A vehicle seat support as claimed in claim 1, wherein said stops which are provided at the opposite ends of the female members are constituted by deformed end parts of those limbs of the female slide members with which corresponding limbs of the male slide members engage with freedom for sliding movement, the deformation of said end parts taking place after the catch lever assembly which includes said male slide members has been caused to engage said female slide members.

3. A vehicle seat support as claimed in claim 1, wherein said shaft is provided with spaced continuous circumferential grooves normal to the longitudinal axis of the shaft, snap-fastening device being detachably fastened to said shaft at each of said grooves and being located in each of said grooves, said devices constituting the stop means whereby said movement of the cross-levers axially of the shaft is prevented.

4. A vehicle seat support as claimed in claim 1, wherein said shaft portions which have cross-sectional shapes other than circular are preferably portions of said shaft each of which is in cross-section a four-sided figure having two opposite sides parallel to one another and to a diameter of the circular rod which constitutes the shaft and whose other two sides are curved outwardly and symmetrically with respect to the longitudinal axis of the shaft, the radii of curvature of the curves being equal to one another and equal to the radius of the circular section rod.

5. A vehicle seat support as claimed in claim 1, wherein said rod which constitutes the shaft has drilled therethrough a diametral passageway which extends completely through the shaft, the passageway being intended for the accommodation of a split-pin having an eye at one end thereof, the angle at which said passageway is drilled being such that the split-pin accommodated therein is canted out of the vertical and away from that part of the seat at which one end of the tension spring is anchored, the other end of said tension spring being anchored to said eye.

6. A vehicle seat support as claimed in claim 5, wherein the angle at which said passageway is drilled is 36° with respect to a diametral plane which is parallel to each of two parallel sides of a four-sided figure whose other two sides are curved outwardly and symmetrically with respect to the longitudinal axis of the shaft, the radii of curvature of the curves being equal to one another and equal to the radius of the circular section rod, the four-sided figure being the shape in cross-section of each of said shaft portions.

* * * * *